US007056955B2

(12) United States Patent
Espinoza et al.

(10) Patent No.: US 7,056,955 B2
(45) Date of Patent: Jun. 6, 2006

(54) ATTRITION RESISTANT BULK METAL CATALYSTS AND METHODS OF MAKING AND USING SAME

(75) Inventors: Rafael L. Espinoza, Ponca City, OK (US); Kandaswamy Jothimurugesan, Ponca City, OK (US); Ajoy P. Raje, Stillwater, OK (US); Kevin L. Coy, Ponca City, OK (US); Nithya Srinivasan, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/743,856

(22) Filed: Dec. 22, 2003

(65) Prior Publication Data

US 2004/0259960 A1    Dec. 23, 2004

Related U.S. Application Data

(60) Provisional application No. 60/435,043, filed on Dec. 20, 2002.

(51) Int. Cl.
*C07C 27/00* (2006.01)
(52) U.S. Cl. ............... 518/715; 518/714; 518/717; 518/718; 518/720; 518/721
(58) Field of Classification Search ............... 518/700, 518/714, 715, 717, 718, 720, 721
See application file for complete search history.

(56) References Cited

U.S. PATENT DOCUMENTS

| 2,244,573 A | 6/1941 | Roberts, Jr. |
| 4,499,209 A | 2/1985 | Hoek et al. |
| 4,522,939 A | 6/1985 | Minderhoud et al. |
| 4,579,985 A | 4/1986 | Minderhoud et al. |
| 4,594,468 A | 6/1986 | Minderhoud et al. |
| 4,628,133 A | 12/1986 | Minderhoud et al. |
| 4,822,824 A | 4/1989 | Iglesia et al. |
| 5,140,050 A | 8/1992 | Mauldin et al. ............ 518/715 |
| 6,107,238 A | 8/2000 | Contractor et al. |
| 6,124,367 A | 9/2000 | Plecha et al. ............... 518/715 |
| 6,130,184 A | 10/2000 | Geerlings et al. ........... 502/350 |
| 6,548,440 B1 | 4/2003 | Pham et al. |
| 6,586,481 B1 | 7/2003 | Pederzani et al. |
| 2002/0019309 A1 | 2/2002 | Lapidus et al. |
| 2002/0028745 A1 | 3/2002 | Krylova et al. |
| 2003/0207752 A1 | 11/2003 | Pham et al. |

FOREIGN PATENT DOCUMENTS

| EP | 0110 449 B1 | 6/1984 |
| EP | 0109702 B1 | 3/1988 |
| EP | 0266 898 A2 | 5/1988 |
| EP | 0153781 B1 | 10/1988 |
| EP | 0455 307 A1 | 11/1991 |
| EP | 0510772 B1 | 12/1995 |
| EP | 0510771 B1 | 7/1996 |
| EP | 0583837 B1 | 11/1997 |

OTHER PUBLICATIONS

PCT International Search Report for Application No. PCT/US03/40845 Dated Apr. 18, 2004 (3 p.).
Iglesia et al., "Fischer-Tropsch Synthesis on Cobalt and Ruthenium. Metal Dispersion and Support Effects on Reaction Rate and Selectivity," Journal of Catalysis, vol. 137, (1992), pp. 212-224.
Saib et al., "Silica supported cobalt Fischer-Tropsch catalysts: effects of pore diameter of support", Catalysis Today, Issues 3-4, vol. 71 (Jan. 2002), pp. 395-402.
Schulz et al., "Construction of the Fischer-Tropsch regime with cobalt catalysts," Catalysis Today, vol. 71, Issues 3-4, (Jan. 2002), pp. 351-360.
Hurlbut, R.S., Puskas, I., Schumacher, D.J., "Fine details on the selectivity and kinetics of the Fischer-Tropsch synthesis over precipitated cobalt catalysts by combination of quantitative gas chromatography and modelling," ACS Div. Fuel Chem. Prepr., vol. 40(1), 1995, pp. 158-166.
Patzlaff, et al., "Interpretation and kinetic modeling of product distributions of cobalt catalyzed Fischer-Tropsch synthesis," Catalysis Today, Issues 3-4, vol. 71 (Jan. 2002) pp. 381-394.
Pham et al. "Improving the attrition resistance of slurry phase heterogeneous catalysts," Powder Technology, vol. 110 Issue 3 (Jun. 2000), pp. 196-203.
Wei et al, "Attrition resistance of cobalt F-T catalysts for slurry bubble col. reactor use", Applied Catalysis A: General, vol. 210 (Mar. 2001), pp. 137-150.

*Primary Examiner*—J. Parsa
(74) *Attorney, Agent, or Firm*—Conley Rose P.C.

(57) ABSTRACT

According to a preferred embodiment, the present invention features a bulk catalyst that includes precipitated cobalt metal. The precipitated cobalt catalyst further includes a textural promoter, a binder and optionally a Group I metal. The method of making the catalyst is optimized so as to enhance attrition resistance and improve activity. According to some embodiments, the present catalyst is made by a method that includes one or a combination of: calcination under optimized temperature conditions; exposure to an acidic solution; and addition of a binder to a suspension of a precipitate. According to some embodiments, a Fischer-Tropsch process includes contacting the present catalyst with a feed stream containing carbon monoxide and hydrogen so as to produce hydrocarbons.

26 Claims, 2 Drawing Sheets

ATTRITION RESISTANT BULK METAL CATALYSTS AND METHODS OF MAKING AND USING SAME

STATEMENT REGARDING FEDERALLY SPONSORED RESEARCH OR DEVELOPMENT

Not Applicable.

TECHNICAL FIELD OF THE INVENTION

The present invention relates to a precipitated bulk metal catalyst comprising preferably cobalt, having improved attrition resistance. More particularly, the present invention relates to bulk cobalt catalyst compositions and methods of making such bulk catalysts. The bulk cobalt-based catalyst is suitable for use in a Fischer-Tropsch synthesis, and provides good selectivity to C5+ hydrocarbon products.

BACKGROUND

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas.

Further, naturally occurring sources of crude oil used for liquid fuels such as gasoline and middle distillates have been decreasing and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require the energy, equipment, and expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is reacted with hydrogen to form organic molecules containing carbon and hydrogen. Those organic molecules containing only carbon and hydrogen are known as hydrocarbons. In addition, other organic molecules containing oxygen in addition to carbon and hydrogen are known as oxygenates and may be formed during the Fischer-Tropsch process. Hydrocarbons having carbons linked in a straight chain are known as aliphatic hydrocarbons, which may include paraffins and/or olefins. Paraffins are particularly desirable as the basis of synthetic diesel fuel.

Typically the Fischer-Tropsch product stream contains hydrocarbons having a range of numbers of carbon atoms, and thus having a range of molecular weights. Thus, the Fischer-Tropsch products produced by conversion of natural gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, as well as heavier middle distillates. Hydrocarbon waxes may be subjected to an additional processing step for conversion to liquid and/or gaseous hydrocarbons. Thus, in the production of a Fischer-Tropsch product stream for processing to a fuel it is desirable to maximize the production of high value liquid and/or wax hydrocarbons, such as hydrocarbons with at least 5 carbon atoms per hydrocarbon molecule ($C_{5+}$ hydrocarbons).

Typically, in the Fischer-Tropsch synthesis, the distribution of weights that is observed such as for $C_{5+}$ hydrocarbons, can be described by likening the Fischer-Tropsch reaction to a polymerization reaction with an Anderson-Shultz-Flory chain growth probability ($\alpha$) that is independent of the number of carbon atoms in the lengthening molecule. $\alpha$ is typically interpreted as the ratio of the mole fraction of $C_{n+1}$ product to the mole fraction of $C_n$ product. A value of $\alpha$ of at least 0.72 is preferred for producing high value liquid and/or wax hydrocarbons, such as $C_{5+}$ hydrocarbons.

The Fischer-Tropsch process is commonly facilitated by a catalyst. Catalysts desirably have the function of increasing the rate of a reaction without being consumed by the reaction. A feed containing carbon monoxide and hydrogen is typically contacted with a catalyst in a reaction zone that may include one or more reactors.

The composition of a catalyst influences the relative amounts of hydrocarbons obtained from a Fischer-Tropsch catalytic process. Common catalysts for use in the Fischer-Tropsch process contain at least one metal from Group VIII of the Periodic Table (in the old IUPAC notation as illustrated in, for example, the *CRC Handbook of Chemistry and Physics*, $81^{st}$ *Edition*, 2000–2001, said reference being the standard which is used throughout the present specification).

Fischer-Tropsch catalysts have typically been prepared by depositing the active metal and any promoters on a support. The support is typically a porous material that provides mechanical strength. The support further provides a high surface area per amount of catalytic metal. Catalyst supports for catalysts used in Fischer-Tropsch synthesis of hydrocarbons have typically been refractory oxides (e.g., silica, alumina, titania, zirconia or mixtures thereof). The final catalyst typically may have an active metal surface area of about 10 square meters of metal per gram catalyst.

Supported cobalt catalysts have the disadvantage that interactions often occur between the active metal and the support. It is known that these metal-support interactions tend to limit the reducibility of supported cobalt and/or contribute to catalyst deactivation. Thus, it is a common practice to add to the catalyst a reduction promoter. However, typically a reduction promoter is a precious metal that contributes to the cost of the catalyst. Thus, there remains a need for alternative Fischer-Tropsch catalysts and methods for preparing same.

SUMMARY OF THE INVENTION

According to a preferred embodiment, the present invention features a catalyst that includes precipitated active metal. The method of making the catalyst is optimized for enhanced attrition resistance and selectivity to $C_{5+}$ hydrocarbons while still achieving high activity in the Fischer-Tropsch reaction. The active metal preferably includes a Group VIII metal, more preferably selected from the group consisting of cobalt, iron, and nickel, still more preferably cobalt.

According to some embodiments, the present method includes exposing the precipitate to an acidic solution.

According to some embodiments the present method further includes adding a binder to the catalyst. The binder is preferably a refractory oxide. The refractory oxide is preferably selected from the group consisting of silica, alumina, and combinations thereof.

According to some embodiments, the present method includes one or more of adding a precursor compound of the binder to a slurry of the precipitate and adding a binder sol to the slurry. The binder sol may include particles having an average size between 10 and 100 nm. When used in combination, the binder sol and the binder precursor compound may include the same binder. According to some embodiments the catalyst includes 5–15 wt. % binder derived from a precursor compound of the binder and 35–50 wt. % binder derived from a sol of the binder. When the binder is silica, the precursor compound may be silicic acid and the sol may be colloidal silica sol.

According to some embodiments the present method further includes spray drying the slurry to form porous microparticles of catalyst.

According to some embodiments, the present catalyst is made by a method that includes controlling the calcination conditions so as to enhance the attrition resistance of the catalyst. According to some embodiments, the present catalyst preparation method includes calcining a precipitate or treated precipitate at a calcination temperature between about 200° C. and about 900° C.; preferably at temperature between about 300° C. and about 900° C.; more preferably at temperature between about 400° C. and about 800° C.

According to some embodiments, the present catalyst is made by a method that includes adding a selectivity promoter precursor before spray drying. Alternatively or in combination, according to some embodiments, the present catalyst is made by a method that includes impregnating the calcined catalyst with a promoter. According to some embodiments, the impregnation of the promoter is followed by drying the catalyst, preferably followed by calcining the dry catalyst. The promoter may be any one or combination of a Group I metal, a Group IVA element, and a Fischer-Tropsch promoter.

According to some embodiments the method includes enhancing the mechanical stability by providing a sufficiently small surface area. Further, the activity is maintained by providing a sufficiently large surface area between about 10 to about 150 square meters per gram of catalyst. In accordance with the preferred embodiments, the BET surface area of the catalyst is between about 20 and about 150 square meters per gram of catalyst, more preferably between about 80 and about 150 square meters per gram of catalyst.

According to some embodiments, the present catalyst includes a plurality of crystallites of various sizes. The average crystallite size is optimized to minimize the rate of deactivation while still achieving high reducibility and/or resistance to oxidation. Thus, in accordance with some embodiments, the average crystallite size is between about 10 and about 40 nm.

According to some embodiments, the present catalyst includes from about 40 to about 90 wt. % active metal, from about 5 to about 60 wt. % binder, from about 0.1 to about 10 wt. % textural promoter, from about 0 to about 0.5% selectivity promoter, and from about 0 to about 0.1 wt. % other Fischer-Tropsch promoter. Alternate compositions may include from about 40 to about 85 wt. % active metal, from about 10 to about 60 wt. % binder, from about 2 to about 5 wt. % textural promoter, from about 0 to about 0.5% selectivity promoter, and from about 0 to about 0.1 wt. % other Fischer-Tropsch promoter.

According to some embodiments, a process for producing liquid fuel includes contacting the present catalyst and/or a catalyst made by the present method with a feed stream containing carbon monoxide and hydrogen so as to produce hydrocarbons.

According to some embodiments the hydrocarbons include nongaseous and/or liquid hydrocarbons. The liquid hydrocarbons can comprise middle distillates or gasoline. The middle distillates can comprise diesel fuel, kerosene, jet fuel, heating oil, and the like. The nongaseous hydrocarbons can comprise wax. Further, according to some embodiments the liquid fuel includes gasoline and/or middle distillates.

According to some embodiments the catalyst is disposed in a fixed bed. According to other embodiments, the catalyst is disposed in a slurry bed. It will be understood that the terms slurry bubble column and slurry bed are used interchangeably herein.

Further, it will be understood that throughout the present specification, the term "compound" is not limited to a covalently bonded compound and thus may refer to an ionically bonded compound, such as a salt.

Still further, as used herein, a supported catalyst is a catalyst prepared by depositing an active metal to a preformed bulk support.

The present invention provides a catalyst, methods of making same, and methods of using same that are effective for enabling high catalyst attrition resistance in combination with Fischer-Tropsch activity and/or selectivity.

Thus, the present invention comprises a combination of features and advantages which enable it to overcome various problems of prior catalysts and processes. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF A PREFERRED EMBODIMENT

Catalyst

Figure 1:
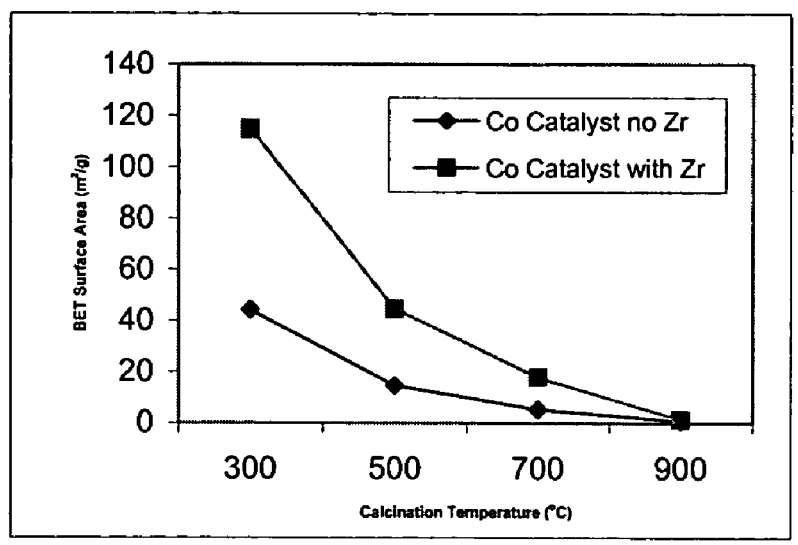
FIG. 1 is a plot illustrating the change in surface area with calcination temperature for unpromoted and promoted precipitated bulk cobalt catalysts.

According to an embodiment of the present invention, effective Fischer-Tropsch catalysts may include a precipitated active metal and a binder. Optionally the catalyst may further include a promoter, preferably selected from among a textural promoter, a Group I metal, a Fischer-Tropsch promoter, and combinations thereof.

The amount of the active metal is preferably between about 40 and about 90 percent by weight of the total catalyst (herein termed "wt. %"). The active metal preferably imparts catalytic activity. Suitable active metals include the Fischer-Tropsch metals, such as Group VIII metals from the Periodic Table (previous IUPAC notation), preferably selected from the group consisting of cobalt, iron, and nickel, more preferably cobalt.

The amount of the binder is preferably at least 5 wt %, more preferably between about 10 and about 60 wt. %. The binder preferably provides adequate catalyst attrition resistance. The binder is preferably a refractory oxide. Suitable refractory oxides include silica, alumina, titania, zirconia, combinations thereof, and the like.

The amount of a textural promoter is preferably between about 0.1 and about 10 wt. %, more preferably between about 2 and about 5 wt. %. The addition of the textural promoter preferably increases the BET surface area when the calcination temperature is held constant. Suitable textural promoters preferably include one element selected from the group consisting of lanthamides metals and elements from Groups IIIA, IVA, and VIA of the Periodic Table. A preferred textural promoter comprises zirconium, chromium, cerium, magnesium, or titanium. More preferably, the textural promoter comprises zirconium.

The amount of a promoter from the Group I metal is preferably between about 0.05 and 5, more preferably 0.5 and 2, still more preferably between about 0.1 and about 0.2 wt. %. The Group I metal preferably increases the selectivity of the catalyst to $C_{5+}$ hydrocarbons and particularly increases wax production in the Fischer-Tropsch reaction. When the active metal includes cobalt, the preferred Group I promoter comprises potassium. When the active metal includes iron, preferred Group I promoters includes potassium, lithium, and combinations thereof.

The amount of other non-Group I Fischer-Tropsch promoter is preferably between about 0 and about 4 wt. %. The promoter may be any suitable promoter known to increase the performance of a Fischer-Tropsch catalyst. It is believed that suitable promoters for the present catalysts include any promoter known to increase the performance of Fischer-Tropsch catalysts, including bulk precipitated metal catalysts and supported catalysts.

In particular, suitable non-Group I Fischer-Tropsch promoters for a cobalt catalyst include, but are not limited to, rhenium, ruthenium, platinum, palladium, boron, silver, and combinations thereof.

Further, suitable non-Group I Fischer-Tropsch promoters for an iron catalyst include, but are not limited to silver, manganese, zinc, calcium, magnesium, boron, aluminum, and combinations thereof.

Method of Preparation

The present catalyst is preferably made by a method that enhances the attrition resistance of the catalyst. The present method preferably includes precipitating the active metal from an active-metal solution so as to form a precipitate, treating the precipitate with an acidic solution so as to form a treated precipitate, and calcining the treated precipitate so as to form a catalyst. Precipitating the active metal may include adding any one or combination of a textural promoter, a binder, and a Group I metal to the active metal-containing solution. Treating the precipitate may include any one or combination of forming a slurry of the precipitate, exposing the precipitate to an acidic solution, and adding a binder to the precipitate, and spray-drying the precipitate. Further, a binder may be added to the slurry and/or acidic solution. The binder may be added as a precursor compound in solution and/or as a colloidal sol. Thus, the treating step may include mixing the precipitate with a binder precursor compound and with a binder colloidal sol. Therefore, the treating step may include incorporating a first portion of the binder into the catalyst via the precursor compound and incorporating a second portion of the binder into the catalyst via the sol. The present method may further include depositing at least one of the optional Group I metal and any optional Fischer-Tropsch promoter to the catalyst. The method may further include activating the catalyst for catalytic activity by any suitable procedure, such as reduction.

Precipitation

Preparation of the precipitation solution preferably includes mixing a compound of the active metal with a solvent. Suitable solvents include water, acids or acetic solutions, and organic solvent. The preferred solvent comprises water. By way of example and not limitation, when the active metal includes cobalt, suitable cobalt-containing precursor compounds include, for example, hydrated cobalt nitrate (e.g. cobalt nitrate hexadydrate), cobalt carbonyl, cobalt acetate, cobalt acetylacetonate, cobalt oxalate, and the like. Hydrated cobalt nitrate, cobalt carbonyl and cobalt acetate are exemplary of cobalt-containing precursor compounds soluble in water. Cobalt oxalate is soluble in acids or acidic solutions. Cobalt acetate and cobalt acetylacetonate are exemplary of cobalt-containing precursor compounds soluble in an organic solvent.

Preparation of the precipitation solution may include mixing a compound of the textural promoter with the solvent. The compound of the textural promoter is preferably a nitrate salt of said structural promoter. When the textural promoter comprises zirconium, suitable compounds of zirconium include water-soluble salts such as zirconium nitrate and the like. When the textural promoter comprises titanium, suitable compounds of titanium include titanium-comprising salts such as titanium nitrate.

Preparation of the precipitation solution may include mixing a compound of the Group I metal. When the Group I metal is potassium, suitable compounds of potassium include water-soluble salts such as potassium bicarbonate or potassium carbonate.

It will be understood the mixing in of any optional components of the catalyst is optionally done at any stage during the preparation of the catalyst.

Precipitation is preferably initiated by adding a precipitating agent to the solution. The pH of the solution is preferably maintained at a constant value while precipitation proceeds. A suitable precipitation agent includes a basic solution. Examples of precipitation agents include urea, ammonium and/or carbonate salts, such as sodium carbonate, ammonium carbonate, ammonium hydroxide and the like. Carbonate salts of sodium are preferred precipitating agents. The value of the pH is preferably between about 6.5 and about 8.5, more preferably between about 6.5 and about 7.5, still more preferably at about 7.0. The temperature is preferably maintained at a constant value between 30–90° C. while precipitation proceeds and more preferably ranging from 70–90° C.

The precipitate that forms is preferably filtered. The filtered precipitate is preferably washed, preferably with deionized water. The washing step includes eliminating primarily the unused precipitation agent, and it should be done for a sufficient amount of time so as to remove most of the cations derived from the precipitation agent sources. The conductivity of the spent wash solution is measured and the wash step is done for a sufficient amount of time so as to achieve a conductivity of less than 50 microSiemens (μS).

Alternatively, when a precipitation agent comprises sodium cations, the contacting time during the wash should be performed for a sufficient amount of time so as to exchange substantially all of the sodium cations by some alternate cations present in the wash solution. For example, the washed precipitate should comprise not more than about 0.1% by weight $Na_2O$; preferably no more than about 0.01% by weight $Na_2O$; and more preferably no more than about 0.005% by weight.

Treatment for Attrition Resistance

Acid Treatment

The washed precipitate is preferably treated using a procedure that improves the attrition resistance of the catalyst relative to one prepared by a corresponding process except without the treatment. The treatment may include at least one of exposing the precipitate to an acidic solution, mixing the precipitate with a binder or binder precursor, and combinations thereof.

Exposing the precipitate to an acidic solution preferably includes mixing the precipitate with the acidic solution so as to form a slurry. The acidic solution preferably includes an aqueous solution of an acid. Suitable acids include nitric acid, hydrofluoric acid, acetic acid, and the like. The pH of the acidic solution is preferably between about 0.1 and about 3. Exposing the precipitate to an acidic solution may further include aging the slurry. The slurry is preferably aged for between 1 and 4 hours. The aging may occur while agitating the solution such as under mixing conditions.

While not wishing to be limited by the following interpretation, the present inventors believe that the acid treatment creates shorter bond lengths within the catalyst, thus strengthening the bonds and thereby making the catalyst more attrition resistant. The acid treatment may further influence the physical properties of the catalyst, in particular the properties related to the porosity of the catalyst such as average pore size. Thus the conditions of the acid treatment may be optimized so as to optimize the performance of the catalyst.

After exposure to the acidic solution, the precipitate is preferably filtered and washed so as to remove the acid. Suitable washing solutions include deionized water. Binder addition Treating the precipitate may include mixing a binder with the slurry. The binder may be in the form of a precursor compound of the binder. When the binder is silica, the binder precursor compound is preferably silicic acid. Alternatively, or in combination, the binder may be in the form of a colloidal sol of the binder, herein termed binder sol. The sol preferably includes particles of the binder having an average size between 10 and 100 nm. In this instances, when the binder is silica, the binder sol is preferably a colloidal silica sol. When the treating step includes adding a binder precursor compound and a binder sol to the precipitate, the amounts of binder precursor compound and binder sol are preferably selected such that the catalyst includes 5–15 wt. % binder derived from the binder precursor compound and 10–40 wt. % binder derived from the binder sol. Two particularly preferred embodiments include using about 10 wt. % binder derived from the binder precursor compound with about 23–27 wt. %, and more particularly 24–26 wt%, binder derived from the binder sol, or using about 10 wt. % binder derived from the binder precursor compound with about 37–40 wt. % binder derived from the binder sol.

Mixing the precipitate with an acidic solution and with a binder may occur in any order or combination. Thus the binder may be mixed with the slurry before, during, or after any aging of the slurry. A binder sol preferably includes the binder and a suspending liquid. The suspending liquid is preferably an aqueous solution. A binder precursor compound is preferably in solution, preferably aqueous solution. Mixing of the binder with the slurry preferably includes maintaining the pH at a predetermined value, such as the above-disclosed pH values for acid treatment of the precipitate.

The binder is preferably a refractory oxide. Alternatively, the binder may be any suitable conventional binder. The binder preferably reduces the active metal content of the catalyst while increasing the structural integrity of the catalyst. The binder preferably increases the attrition resistance of the catalyst with respect to a catalyst made by a corresponding method except for the exclusion of the addition of binder. Suitable binders include silica, alumina, and combinations thereof. The binder sol may be prepared by addition of corresponding binder precursors to the suspending liquid. For example, suitable binder precursors include a compound of silicon, a compound of aluminum, combinations thereof, and the like. In one preferred embodiment of a Fischer-Tropsch catalyst in accordance with the present invention, a binder comprising silica comprises 5–15% silica from silicic acid and 35–50% silica from a colloidal silica sol wherein silica particles in the sol have an average size between 10 and 100 nm. In yet another embodiment of a Fischer-Tropsch catalyst in accordance with the present invention, a binder comprising silica comprises 5–15% silica from silicic acid and 10–20% silica from a colloidal silica sol wherein silica particles in the sol having an average size between 10 and 100 nm.

Drying

The treatment may include drying the slurry or binder/slurry mixture so as to form a catalyst precursor. When the drying step includes spray drying, the slurry or binder/slurry mixture preferably has a solid content of from about 20% to about 40% by weight of the total weight of the slurry or binder/slurry mixture. Drying preferably includes spray-drying. Spray-drying comprises passing the slurry or binder/slurry mixture through a spray-drier with an inlet temperature of from about 200° C. to about 425° C. and an outlet temperature of from about 100° C. to about 140° C. The conditions of spray drying are preferably optimized so as to optimize the distribution of sizes of the resulting catalyst particles. The particles preferably each have a size between about 10 and about 200 μm (microns) when the catalyst is intended for use in a slurry bed reactor. Further, the average size of the particles is preferably between about 40 and about 100 microns, and more preferably between about 70 and about 90 microns when the catalyst is intended for use in a slurry bed reactor. Alternatively, particles of catalyst preferably have a size greater than 0.5 mm, preferably greater than about 1 mm when the catalyst is intended for use in a fixed bed reactor.

The material resulting from the present treatment for structural integrity is herein termed a treated precipitate.

Calcination

The precipitate, as untreated precipitated or as treated precipitated, is preferably calcined in an oxidizing atmosphere. The oxidizing atmosphere is preferably air. The calcination preferably proceeds at a temperature between about 200° C. and about 900° C., more preferably between about 300° C. and about 900° C., still more preferably between about 400° C. and about 800° C. In some embodiments, the calcination temperature range may be between about 500° C. and about 900° C. The calcination preferably proceeds at a suitable pressure and for a suitable duration of time. Suitable conditions include a pressure between about 0 and about 75 atm, preferably between 0 and about 10 atm, more preferably between about 1 atm and 5 atm, still more preferably at about 1 atm. The calcination preferably includes subjecting the precipitate to heat in an oxidizing atmosphere, such as air or other suitable oxygen-containing gas. A suitable duration is between about 0.5 and about 24 hours, preferably between about 1 and about 10 hours.

The present inventors have discovered that the optimization of the calcination temperature optimizes the properties of the catalyst, such as active metal crystallite size and BET surface area. Further, the present inventors have discovered that the optimization of the calcination temperature optimizes the performance of the catalyst in the Fischer-Tropsch reaction. Thus, the optimization of the calcination temperature produces a bulk precipitated metal catalyst active in the Fischer-Tropsch reaction that further has improved attrition resistance.

The material resulting from the calcination is herein termed a bulk catalyst.

It will be understood that optionally an acid treatment may follow calcination. When the acid treatment follows calcination, any mixing of the precipitate with a binder sol preferably precedes calcination.

Deposition of Optional Materials

The preparation of the catalyst may include deposition of optional catalyst components, such as the Group I metal and a Fischer-Tropsch promoter. The deposition of an optional component preferably includes at least one step of impregnation of a precursor of the component, preferably via incipient wetness impregnation. The deposition may include multiple impregnation steps. Although impregnation is the preferred method of deposition of these optional components, other methods such as chemical vapor deposition, precipitation, plasma sputtering, or combinations thereof.

When a Group I metal is deposited, the Group I metal is preferably deposited in the last of any multiple steps. It will be understood that wax selectivity may be optimized, for example by optimizing the amount of any optional Group I metal. However the deposition of a Group I metal can also be done at the precipitation stage and can be added to the mixture comprising cobalt and the textural promoter, and is expected to be as equally effective as after precipitation and calcination.

When the Group I metal is potassium, suitable compounds of potassium include water-soluble salts such as potassium bicarbonate or potassium carbonate.

The optional Fischer-Tropsch promoter is preferably selected from the group consisting of rhenium, ruthenium, platinum, palladium, boron, silver, and combinations thereof.

Suitable rhenium-containing precursor compounds soluble in water are preferred and include, for example, perrhenic acid, ammonium perrhenate, rhenium pentacarbonyl chloride, rhenium carbonyl, and the like.

Suitable ruthenium-containing precursor compounds soluble in water include for example ruthenium carbonyl, $Ru(NH_3)_6.Cl_3$, $Ru(III)2,4$-pentanedionoate, ruthenium nitrosyl nitrate, and the like. Water-soluble ruthenium-containing precursor compounds are preferred.

Suitable platinum-containing precursor compounds soluble in water include, for example, $Pt(NH_3)_4(NO_3)_2$ and the like. Alternatively, the platinum-containing precursor may be soluble in an organic solvent, such as platinum acetyl acetonate soluble in acetone.

Suitable boron-containing precursor compounds soluble in water include, for example, boric acid, and the like. Alternatively, the boron-containing precursor may be soluble in an organic solvent.

Suitable silver-containing precursor compounds soluble in water include, for example, silver nitrate ($AgNO_3$) and the like. Alternatively, the silver-containing precursor may be soluble in an organic solvent.

Suitable palladium-containing precursor compounds include palladium nitrate ($Pd(NO_3)_2$) and the like. Suitable palladium-containing precursor compounds soluble in an organic solvent include palladium dioxide ($PdO_2$), which is soluble in acetone, and the like.

It will be understood that selection of suitable precursors for alternative promoters is within the skill of one of ordinary skill in the art, for example by consulting the Chemical Rubber Handbook tables of inorganic compounds and their solubilities.

Each step of impregnation is preferably followed by at least one of drying, calcination, and combinations thereof. Suitable drying conditions include a temperature between about 70 and about 150° C., preferably between about 80 and about 120° C., and a pressure between 0 and 10 atm, preferably between about 1 and about 10 atm, more preferably between 1 and 5 atm, still more preferably at about 1 atm. Drying preferably proceeds for between about 0.5 and about 24 hours. Suitable calcination conditions include a temperature between about 200 and about 500° C. and a pressure between about 1 and about 10 atm. When the catalyst volume is on a laboratory scale, drying preferably proceeds for between about 0.5 and about 10 hours.

Activation

Typically, at least a portion of the metal(s) of the catalytic metal component of the catalysts of the present invention is present in a reduced state (i.e., in the metallic state). Therefore, it is normally advantageous to activate the catalyst prior to use by a reduction treatment in the presence of a reducing gas at an elevated temperature. The reducing gas preferably includes hydrogen. Typically, the catalyst is treated with hydrogen or a hydrogen-rich gas at a temperature in the range of from about 200° C. to about 650° C., preferably from about 300 to about 550° C. for about 0.5 to about 50 hours at a pressure of about 1 to about 75 atm, preferably about 1 to about 10 atm. Pure hydrogen may be used in the reduction treatment, as may a mixture of hydrogen and an inert gas such as nitrogen, or a mixture of hydrogen and other gases as are known in the art, such as carbon monoxide and carbon dioxide. Reduction with pure hydrogen and reduction with a mixture of hydrogen and carbon monoxide are preferred. The amount of hydrogen may range from about 1% to about 100% by volume.

Scale Up

It will be understood that varying conditions, such as durations of procedures, and sizes of apparatuses, so as to scale up a method or process as disclosed herein from laboratory scale to commercial scale is within the skill of one of ordinary skill in the art.

Fischer-Tropsch Operation

A process for producing a liquids fuel preferably includes contacting a feed stream that includes carbon monoxide and hydrogen with the present catalyst. Alternatively or in combination, a process for producing hydrocarbons includes contacting a feed stream that includes carbon monoxide and hydrogen with a catalyst in reaction zone so as to produce hydrocarbons, where the catalyst is a catalyst made according to the present method.

The feed gases charged to the process of the invention comprise hydrogen, or a hydrogen source, and carbon monoxide. $H_2/CO$ mixtures suitable as a feedstock for conversion to hydrocarbons according to the process of this invention can be obtained from any source known to those skilled in the art, including, for example, from conversion of natural gas or light hydrocarbons of five carbons atoms or less by steam reforming, dry ($CO_2$) reforming, auto-thermal reforming, advanced gas heated reforming, partial oxidation, catalytic partial oxidation, or other processes known in the art; or from coal by gasification; or from biomass. In addition the feed gases can comprise off-gas recycle from the present or another Fischer-Tropsch process. Preferably the hydrogen is provided by free hydrogen. It is preferred that the molar ratio of hydrogen to carbon monoxide in the feed be greater than 0.5:1 (e.g., from about 0.67 to 2.5). More preferably, when a precipitated cobalt catalyst according to the present invention is used, the feed gas stream contains hydrogen and carbon monoxide in a molar ratio of from about 1.4:1 to about 2.3:1, preferably from about 1.7:1 to about 2.2:1. The feed gas may also contain carbon dioxide. The feed gas stream should contain only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, hydrogen cyanide, ammonia and carbonyl sulfides.

The feed gas is contacted with the catalyst in a reaction zone. Mechanical arrangements of conventional design may be employed as the reaction zone including, for example, fixed bed, fluidized bed, slurry bubble column or ebulliating bed reactors, among others. Accordingly, the preferred size and physical form of the catalyst particles may vary depending on the reactor in which they are to be used.

Plug flow, fluidized bed, reactive distillation, ebulliating bed, and continuous stirred tank reactors have been delineated in "Chemical Reaction Engineering," by Octave Levenspiel, and are known in the art. A preferred slurry bubble column is described in co-pending commonly assigned U.S. patent application Ser. No. 10/193,357, and published as U.S. Patent Application No. 2003/0114543, hereby incorporated herein by reference.

The Fischer-Tropsch process is typically run in a continuous mode. In this mode, the gas hourly space velocity through the reaction zone typically may range from about 50 to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions of pressure (101 kPa) and temperature (0° C.). The reaction zone volume is defined by the portion of the reaction vessel volume where reaction takes place and which is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C., more preferably from about 200° C. to about 230° C. The reaction zone pressure is typically in the range of about 80 psia (552 kPa) to about 1000 psia (6895 kPa), more preferably from 80 psia (552 kPa) to about 800 psia (5515 kPa), and still more preferably, from about 140 psia (965 kPa) to about 750 psia (5170 kPa). Most preferably, the reaction zone pressure is from about 250 psia (1720 kPa) to about 650 psia (4480 kPa). In some embodiments, the pressure may be selected from 80 psia (552 kPa) to about 600 psia (4137 kPa), or from about 140 psia (965 kPa) to about 500 psia (3447 kPa).

The products resulting from the process will have a great range of molecular weights. Typically, the carbon number range of the product hydrocarbons will start at methane and continue to about 50 to 100 carbons or more per molecule as measured by current analytical techniques. The process is particularly useful for making hydrocarbons having five or more carbon atoms especially when the above-referenced preferred space velocity, temperature and pressure ranges are employed.

The wide range of hydrocarbons produced in the reaction zone will typically afford liquid phase products at the reaction zone operating conditions. Therefore the effluent stream of the reaction zone will often be a mixed phase stream including liquid and vapor phase products. The effluent stream of the reaction zone may be cooled to condense additional amounts of hydrocarbons and passed into a vapor-liquid separation zone separating the liquid and vapor phase products. The vapor phase material may be passed into a second stage of cooling for recovery of additional hydrocarbons. The liquid phase material from the initial vapor-liquid separation zone together with any liquid from a subsequent separation zone may be fed into a fractionation column. Typically, a stripping column is employed first to remove light hydrocarbons such as propane and butane. The remaining hydrocarbons may be passed into a fractionation column where they are separated by boiling point range into products such as naphtha, kerosene and fuel oils. Hydrocarbons recovered from the reaction zone and having a boiling point above that of the desired products may be passed into conventional processing equipment such as a hydrocracking zone in order to reduce their molecular weight down to desired products such as middle distillates and gasoline. The gas phase recovered from the reactor zone effluent stream after hydrocarbon recovery may be partially recycled if it contains a sufficient quantity of hydrogen and/or carbon monoxide.

Without further elaboration, it is believed that one skilled in the art can, using the description herein, utilize the present invention to its fullest extent. The following exemplary embodiments are to be construed as illustrative, and not as constraining the scope of the present invention in any way whatsoever.

EXAMPLES

Example 1

Variation of Surface Area With Calcination Temperature; and Comparison of Unpromoted Catalyst and Zirconia Promoted-Catalyst

Precipitated cobalt catalysts were prepared at a constant pH of 7.0 using 1.0-M solution of $Co(NO_3)_3.6H_2O$ and $Zr(NO_3)_3.xH_2O$ in the desired Co/Zr ratio, which was precipitated by adding 1.0 M ammonium carbonate solution. 5% zirconia was added as a textural promoter. The precipitate was then thoroughly washed with deionized water by vacuum filtration. The wet cake was then drived in an oven at 110° C. overnight followed by calcination at different temperature in the range of 300–900° C. for three hours. Results are listed in Table 1 and illustrated in FIG. 1. As indicated by Table 1 and as shown in FIG. 1, the BET surface area was higher for the zirconia promoted catalyst than for the unpromoted catalyst.

TABLE 1

Properties of precipitated bulk cobalt catalysts

|  | With No Zr | With Zr | |
| --- | --- | --- | --- |
| Calcination Temp ° C. | BET Surface Area, $m^2/g$ | BET Surface Area, $m^2/g$ | Avg. crystallite size, nm |
| 300 | 44.2 | 114.8 | 10.3 |
| 500 | 14.6 | 44.5 | 20.8 |
| 700 | 5.3 | 17.8 | 31.2 |
| 900 | 0.7 | 1.4 | 38.2 |

Example 2

Variation of Average Crystallite Size with Calcination Temperature

Figure 2:
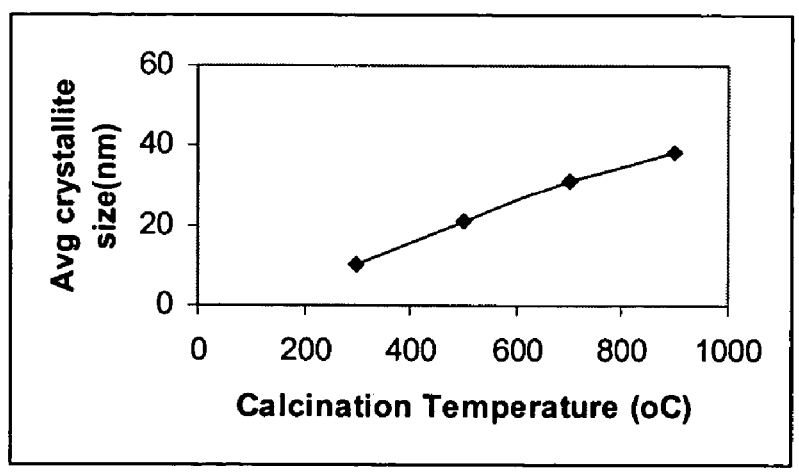
FIG. 2 is a plot illustrating the change in average crystallite size with calcination temperature for precipitated bulk cobalt catalysts.

The average $CO_3O_4$ crystallite sizes for the Zr promoted cobalt catalysts prepared in Example 1 were calculated from x-ray diffraction (XRD). The results are listed in Table 1 and illustrated in FIG. 2. From Table 1 and as shown in FIG. 2, it is clear that the average crystallite size increases with the increase in calcination temperatures.

Example 3

Variation of Average Crystallite Size with Precipitation pH

Figure 3:
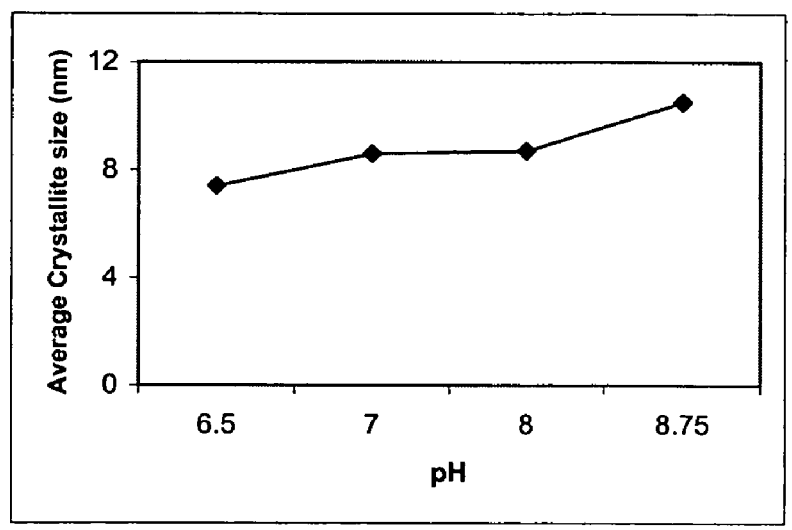
FIG. 3 is a plot illustrating the change in average crystallite size with precipitation pH for precipitated bulk cobalt catalysts.

Precipitated cobalt catalysts were prepared using 1.0-M solution of $Co(NO_3)_3.6H_2O$, which was precipitated by adding 1.0 M ammonium carbonate solution. The precipitation pH level was varied from 6.5 to 9.0. The precipitate was then thoroughly washed with deionized water by vacuum filtration. The wet cake was then dried in an oven at 110° C. overnight, and finally calcined at 300° C. for 2 hours. The results are listed in Table 2. As seen in Table 2, as the pH increases, the surface area decreases. Both the pore volume and the average pore diameter increases as the pH increases from 6.5 to 8.0. Further increase in pH resulted in reduced pore volume and pore diameter. The results listed in Table 2 for variation of average crystallite size vs pH are illustrated in FIG. 3. As seen in FIG. 3, the average crystallite size increases as the pH increases.

TABLE 2

Properties of precipitated bulk cobalt catalysts

| pH | BET Surface Area, $m^2/g$ | Pore volume cc/g | Avg. Pore Dia. Nm | Avg. crystallite Size (nm) |
| --- | --- | --- | --- | --- |
| 6.5 | 163 | 0.39 | 6.9 | 7.4 |
| 7.0 | 145 | 0.44 | 8.8 | 8.6 |
| 8.0 | 140 | 0.52 | 11 | 8.7 |
| 8.75 | 101 | 0.26 | 7.2 | 10.5 |

Example 4

Variation of Average Crystallite Size with Molar Concentration of the Solution

Figure 4:
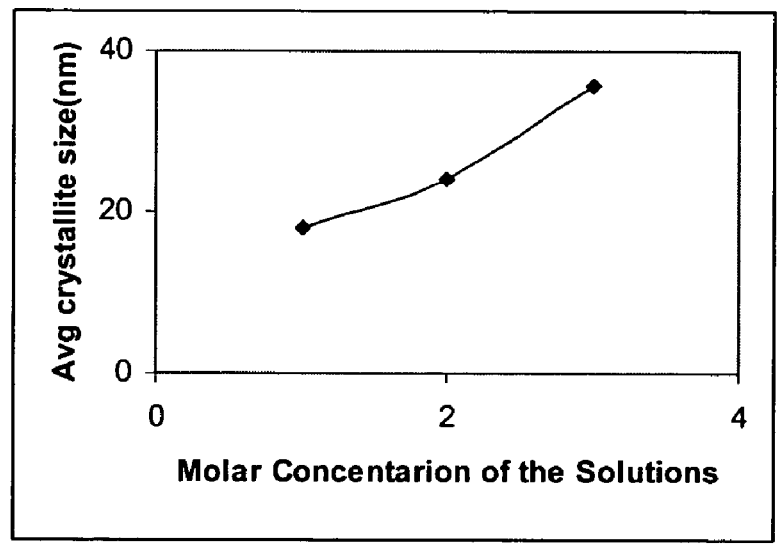
FIG. 4 is a plot illustrating the change in average crystallite size with cobalt molar concentration in solution for precipitated bulk cobalt catalysts.

Several precipitated cobalt catalysts were prepared at a constant pH of 6.5 using solution of $Co(NO_3)_3.6H_2O$ and $Zr(NO_3)_3.xH_2O$ in the desired Co/Zr ratio, which was precipitated by adding ammonium carbonate solution with different molar concentration of the solutions. The precipitate was then thoroughly washed with deionized water by vacuum filtration. The $SiO_2$ binder/support was added as silicic acid to the undried, reslurried Co/Zr precipitate. Finally, the slurry was spray dried. The spray-dried catalyst was finally calcined in air at 850° C. for 4 hours. The results are listed in Table 3. The results for average crystallite size derived from the last three row of Table 3 are illustrated in FIG. 4. As seen in Table 3 and from FIG. 4, as the molar concentration of the ammonium carbonate solution increased from 1M to 3M, the crystallite size increased from 18 to 35.7 nm.

TABLE 3

Properties of precipitated cobalt catalysts

| Catalyst Composition | pH | Molar Conc. | BET Surface Area, $m^2/g$ | Pore volume cc/g | Avg. Pore Dia. nm | Avg. crystallite size, nm |
| --- | --- | --- | --- | --- | --- | --- |
| $85Co/5Zr/10SiO_2$ | 6.5 | 1M | 40 | 0.24 | 19 | 18.0 |
| $85Co/5Zr/10SiO_2$ | 6.5 | 2M | 40 | 0.25 | 20 | 24.0 |
| $85Co/5Zr/10SiO_2$ | 6.5 | 3M | 30 | 0.19 | 21 | 35.7 |

Examples 5–7

Variation of Catalyst Performance with Calcination Temperature

These examples illustrate the effect of calcination temperature on catalyst performance in the Fischer-Tropsch process.

Several catalysts were prepared each having an exemplary catalyst composition of $85Co/5Zr/10SiO_2$. The catalysts differed in the calcination temperature used in preparation. After preparation, each catalyst was reduced with $H_2$ at 310° C. for 6 hours. After the reduction pretreatment, the catalyst was tested at 220° C., 360 psig, 6.0NL/g-cat/hr, using a synthesis gas with a $H_2$-to-CO molar ratio of 2:1 in a fixed bed reactor. Results of catalyst performance obtained at a time of stream of 96 hours are listed in Table 4. The results in Table 4 show that the catalyst calcined at 700° C. showed a high conversion and exhibits good $C_{5+}$ productivity.

Example 5

700° C. Calcination

Cobalt based precipitate was prepared by adding a 1.0 M ammonium carbonate solution to a 1.0 M $Co(NO_3)_3.6H_2O$ and $Zr(NO_3)_3.xH_2O$ solutions in the desired Co/Zr ratio, at a constant of 6.5. The cobalt precipitate was then thoroughly washed with deionized water by vacuum filtration. The silica ($SiO_2$) binder precursor was added as silicic acid to the undried washed Co/Zr precipitate to form a slurry. The slurry was spray dried so as to produce a treated precipitate. The treated precipitate was calcined in air at 700° C. for 5 hours.

Example 6

800° C. Calcination

The procedure of EXAMPLE 5 was used except that the treated precipitate was calcined in air at 800° C. for 4 hours.

Example 7

900° C. Calcination

The procedure of EXAMPLE 5 was used except that the treated precipitate was calcined in air at 900° C. for 4 hours.

TABLE 4

Effect of calcination temperature on fixed-bed results

| Examples | Catalyst ID | Calcination Temp. (° C.) | CO Conv. % | $C_1$ wt % | $C_{5+}$ g/h/kgcat |
|---|---|---|---|---|---|
| 5 | $85Co/5Zr/10SiO_2$ | 700 | 97.1 | 9.1 | 901 |
| 6 | $85Co/5Zr/10SiO_2$ | 800 | 71.2 | 9.5 | 648 |
| 7 | $85Co/5Zr/10SiO_2$ | 900 | 11.1 | 9.0 | 110 |

Examples 8–10

Variation of Catalyst Performance With Binder

These examples illustrate the effect of the binder selection on catalyst performance in the Fischer-Tropsch reaction. The results in Table 5 show that the catalysts with a silica binder and a silica-alumina showed a high conversion and exhibits good $C_{5+}$ productivity.

Various catalysts were prepared having a silica binder, a silica-alumina binder, and an alumina binder. After preparation, each catalyst was reduced with $H_2$ at 310° C. for 6 hours. After the reduction pretreatment, the catalyst was tested at 220° C., 360 psig, 6.0NL/g-cat/hr, using a synthesis gas with a molar ratio $H_2$-to-CO of 2:1 in a fixed bed reactor. The performance testing results obtained in a fixed bed reactor may be found in Table 5 for Examples 8–10.

Example 8

Silica Binder

This example describes the preparation of a catalyst of composition $48.8Co/2.4Zr/48.8SiO_2$. Cobalt based precipitate was prepared by adding a 2.0 M ammonium carbonate solution to a 2.0 M $Co(NO_3)_3.6H_2O$ and $Zr(NO_3)_3.xH_2O$ solutions in the desired Co/Zr ratio, at a constant pH of 7.0. The cobalt precipitate was then thoroughly washed with deionized water by vacuum filtration. The silica sol was added to the undried washed Co/Zr precipitate to form a slurry. The slurry was spray dried and calcined in air at 500° C. for 3 hours. The performance testing results obtained in a fixed bed reactor and in a continuous-flow stirred tank reactor may be found in Table 5 and in Table 6 respectively.

Example 9

Silica-Alumina Binder

This example describes the preparation of a catalyst of composition $40Co/60SiO_2$—$Al_2O_3$. Cobalt precipitate was prepared by adding a 2.0 M ammonium carbonate solution to a 2.0 M $Co(NO_3)_3.6H_2O$ solution, at a constant pH of 7.0. The cobalt precipitate was then thoroughly washed with deionized water by vacuum filtration. A silica-alumina binder sol with a silica-to-alumina molar ratio of 40:1 was prepared by co-precipitating sodium aluminate and sodium silicate with the addition of diluted nitric acid. Then this silica-alumina binder sol was added to the undried washed Co precipitate to form a slurry in the desired weight ratio of Co to $SiO_2$—$Al_2O_3$. The slurry was spray dried and calcined in air at 500° C. for 3 hours. The performance testing results obtained in a fixed bed reactor may be found in Table 5.

Example 10

Alumina Binder

This example describes the preparation of a catalyst of composition $40Co/60Al_2O_3$. Cobalt precipitate was prepared by adding a 2.0 M ammonium carbonate solution to a 2.0 M $Co(NO_3)_3.6H_2O$ solution, at a constant pH of 7.0. The cobalt precipitate was then thoroughly washed with deionized water by vacuum filtration. The alumina binder was prepared by dispersing boehmite alumina from Sasol (Dispal® 18N4-80) in deionized water. Then this alumina binder was added to the undried Co precipitate to form a slurry with a desired ratio of $Co/Al_2O_3$. The slurry was spray dried and calcined in air at 750° C. for 4 hours. The performance testing results obtained in a fixed bed reactor may be found in Table 5.

TABLE 5

Effect of binder on fixed-bed results at a time on stream of 96 hours

| Examples | Catalyst ID | CO Conv. % | $C_1$ wt % | $C_{5+}$ g/h/kgcat |
|---|---|---|---|---|
| 8 | $48.8Co/2.4Zr/48.8SiO_2$ | 79.8 | 8.3 | 787 |
| 9 | $40Co/60SiO_2$—$Al_2O_3$ | 73.3 | 13.9 | 686 |
| 10 | $40Co/60Al_2O_3$ | 38.0 | 10.4 | 371 |

Examples 11–13

Variation of Catalyst Wax Selectivity with Composition

These examples illustrate the effect on catalyst wax selectivity of the presence of a Group I metal promoter and of the amount of binder. The wax selectivity is quantified by the value of α, the Flory-Schultz chain growth probability, computed according to conventional methods.

Two approaches were followed to increase the wax selectivity of the precipitated bulk cobalt catalyst. In one approach, potassium was incorporated to increase the alpha of the precipitated bulk cobalt catalysts. In another approach, the binder content was increased in the catalyst. Typically, the binder used in these catalysts was silica.

After preparation, each catalyst was reduced with $H_2$ at 310° C. for 6 hours. After the reduction pretreatment, the catalyst was tested in a 600-ml slurry bed reactor (CSTR) with operating conditions as listed in Table 6. The results demonstrate that catalysts containing potassium and high binder silica content increase wax selectivity.

In particular, a comparison of the performance of the catalyst of Example 12 with the performance of the catalyst of Example 11 demonstrates increased α with the addition of potassium to the catalyst. These results illustrate improvement in wax selectivity with the addition of a Group I metal to a precipitated Fischer-Tropsch metal catalyst, in particular a precipitated cobalt catalyst.

Further, a comparison of the performance of the catalyst of Example 13 with the performance of the catalyst of Example 11 demonstrates increased α with the increase of the silica content. These results illustrate improvement in wax selectivity with the increase of the binder content in a precipitated Fischer-Tropsch metal catalyst, in particular a precipitated cobalt catalyst.

Example 11

10% Binder from One Silica Precursor

This example describes the preparation of a catalyst of composition $85Co/5Zr/10SiO_2$. Cobalt based precipitate was prepared by adding a 1.0 M ammonium carbonate solution to a 1.0 M $Co(NO_3)_3 \cdot 6H_2O$ and $Zr(NO_3)_3 \cdot xH_2O$ solutions in the desired Co/Zr ratio, at a constant pH of 6.5. The cobalt precipitate was then thoroughly washed with deionized water by vacuum filtration. The $SiO_2$ binder/support was added as silicic acid to the undried, reslurried Co/Zr precipitate. The slurry was spray dried and calcined in air at 750° C. for 5 hours.

Example 12

10% Binder from One Silica Precursor; 0.1% Group I Metal

This example describes the preparation of a catalyst of composition $84.9Co/5Zr/0.1K/10SiO_2$. Cobalt based precipitate was prepared by adding a 2.0 M sodium bicarbonate solution to a 2.0 M $Co(NO_3)_3 \cdot 6H_2O$ and $Zr(NO_3)_3 \cdot xH_2O$ solutions in the desired Co/Zr ratio, at a constant pH of 7.0. The cobalt precipitate was then thoroughly washed with hot deionized water by vacuum filtration. Precursors of the potassium promoter, and the $SiO_2$ binder was added as aqueous potassium bicarbonate ($KHCO_3$) and silicic acid to the undried reslurried Co/Zr precipitate. The slurry was spray dried and calcined in air at 700° C. for 5 hours.

Example 13

48.8% Binder from a Silica Precursor and a Silica Sol

This example describes the preparation of a catalyst of composition $48.8Co/2.4Zr/48.8SiO_2$. Cobalt based precipitate was prepared by adding a 2.0 M ammonium carbonate solution to a 2.0 M $Co(NO_3)_3 \cdot 6H_2O$ and $Zr(NO_3)_3 \cdot xH_2O$ solutions in the desired Co/Z ratio, at a constant pH of 7.0. The cobalt precipitate was then thoroughly washed with deionized water by vacuum filtration. The undried Co/Zr precipitate was further mixed with silicic acid and deionized AS-40 (22 nm) colloidal silica available from Aldrich (LUDOX® AS-40 colloidal silica, 40 wt. % suspension in water; product# 420840) to form a slurry. The slurry was spray dried and calcined in air at 500° C. for 3 hours. Silicic acid and deionized LUDOX® AS-40 (22 nm) colloidal silica were used in amounts sufficient to provide in the spray dried particles about 9.8% silica from the silicic acid and 39% silica from the colloidal silica.

TABLE 6

Continuous-flow stirred tank reactor results for Examples 8, 11–13

| | Example | | | |
|---|---|---|---|---|
| | 8 | 11 | 12 | 13 |
| Catalyst Characteristics | | | | |
| Composition | 48.8Co/ 2.4Zr/ 48.8SiO₂ | 85Co/5Zr/ 10SiO₂ | 84.9Co/ 5Zr/0.1K/ 10SiO₂ | 48.8Co/ 2.4Zr/ 48.8SiO₂ |
| Silica precursors | silica sol | silicic acid | silicic acid | silicic acid; silica sol |
| Synthesis performance | | | | |
| Temp. (° C.) | 225 | 230 | 220 | 225 |
| Pressure (Psig) | 350 | 350 | 350 | 350 |
| Space Vel. (NL/h · g cat) | 12.0 | 7.33 | 9.4 | 12.2 |
| Time on stream (h) | 430 | 265 | 457 | 410 |
| CO Conversion (%) | 38.0 | 23.4 | 37.1 | 39.1 |
| $C_1$, wt % | 12.0 | 15.6 | 12.1 | 12.6 |
| $C_5^+$ (g/hr/kgcat) | 640 | 230 | 476 | 658 |
| Alpha | 0.87 | 0.79 | 0.88 | 0.88 |

Examples 14–18

Variation of Attrition Resistance with Acid Treatment

The catalysts of the Examples 14–18 were evaluated for catalyst attrition resistance. Examples 14–16 were made using a batch precipitation method similarly to the previous Examples, whereas Examples 17–18 were made using a continuous precipitation method. Testing was carried out according to the Jet-Cup, well known to those of normal skill in the art. The results are shown in Table 7 below where attrition loss is measured as percent change in weight after the Jet-Cup test. These results illustrate the improvement of attrition resistance by controlling the preparation of the catalyst. In particular, improved attrition resistance is achieved when (i) treating the precipitate or the calcined bulk catalyst with nitric acid, followed by (ii) when silica binder is added jointly as silicic acid and as colloidal silica sol where in the silica particles in the colloidal silica sol having an average size between 10 and 100 nm. It is believed by the present inventors that silicic acid is representative of binder acids; and colloidal silica sol is representative of binder sols. Thus, it is believed that improved attrition resistance results from the nitric acid treatment and followed by joint addition of a binder acid and a binder sol to a slurried precipitate containing an active metal.

Example 14

No Acid Treatment

This example describes the preparation of a catalyst of composition $84.9Co/5Zr/0.1K/10SiO_2$. Cobalt based precipitate was prepared by adding a 2.0 M sodium bicarbonate solution to a 2.0 M $Co(NO_3)_3 \cdot 6H_2O$ and $Zr(NO_3)_3 \cdot xH_2O$ solutions in the desired Co ratio, at a constant pH of 7.0. The cobalt precipitate was then thoroughly washed with hot deionized water by vacuum filtration. The potassium promoter and the $SiO_2$ binder/support were added as aqueous potassium bicarbonate ($KHCO_3$) and silicic acid, respectively, to the undried, reslurried Co/Zr precipitate. The slurry was spray dried and calcined in air at 850° C. for 4 hours.

Example 15

Acid Treatment After Calcination

This example describes the preparation of a catalyst of composition $48.8Co/2.4Zr/48.8SiO_2$. Cobalt based precipitate was prepared by adding a 2.0 M ammonium carbonate solution to a 2.0 M $Co(NO_3)_3 \cdot 6H_2O$ and $Zr(NO_3)_3 \cdot xH_2O$ solutions in the desired Co/Z ratio, at a constant pH of 7.0. The cobalt precipitate was then thoroughly washed with deionized water by vacuum filtration. The undried, Co/Zr precipitate was further slurried with silicic acid and deionized AS-40 (22 nm) colloidal silica in amounts sufficient to provide in the spray dried particles about 10% silica from the silicic acid and 38.8% silica from the colloidal silica. The slurry was spray dried and calcined in air at 500° C. for 3 hours. The calcined catalyst was then slurried with an acidic solution, in particular 20% $HNO_3$ solution for 1 hour. After one hour, the catalyst was thoroughly washed with deionized water by vacuum filtration. Finally, the catalyst was dried for 16 hours at 120° C. and calcined in air at 300° C. for 2 hours.

Example 16

Acid Treatment Before Calcination

This example describes the preparation of a catalyst of composition $71.3Co/3.7Zr/25SiO_2$. Cobalt based precipitate was prepared by adding a 2.0 M ammonium carbonate solution to a 2.0 M $Co(NO_3)_3 \cdot 6H_2O$ and $Zr(NO_3)_3 \cdot xH_2O$ solutions in the desired Co/Zr ratio, at a constant pH of 7.0. The cobalt precipitate was then thoroughly washed with deionized water by vacuum filtration. The wet cobalt precipitate was then slurried with an acidic solution, in particular 20% $HNO_3$ solution for 1 hour. After one hour, the cobalt precipitate was thoroughly washed with deionized water by vacuum filtration. The undried acid-treated Co/Zr precipitate was further slurried with silicic acid and deionized LUDOX® AS-40 (22 nm) colloidal silica from Aldrich in amounts sufficient to provide in the spray dried particles about 10% of silica from the silicic acid and 15% of silica from the colloidal silica. The slurry was spray dried and calcined in air at 500° C. for 3 hours.

Example 17

Continuous Precipitation and Acid Treatment Before Calcination

This example describes the preparation of a catalyst with the composition of $48.8Co/2.4Zr/48.8SiO_2/0.1K$. A continuous precipitator was used in preparing this catalyst. The precipitator consisted of a glass tube with an ID. of 24 mm. A stainless steel impeller with 10 mm square blades was inserted inside this tube and rotated at about 100 rpm. The tube was heated by the means of a water jacket. A pump circulated heated water from a hot bath continuously, and the temperature was controlled at 70° C.

An aqueous solution containing $Co(NO_3)_3 \cdot 6H_2O$ (2.0 M), together with a concentration of $Zr(NO_3)_3 \cdot xH_2O$ that corresponded to the desired Co/Zr ratio in the final catalyst, and a second solution containing sodium bicarbonate (2.0 M) were heated to 70° C. before being pumped to the precipitator. The pH was measured at the top of the precipitator, and was controlled by adjusting the nitrate and/or sodium bicarbonate solution. The precipitation conditions were 70° C. and a pH of 7.0. The solutions were introduced tangentially at the bottom, and the precipitate slurry overflowed at the top, from where it was taken to the Buchner funnels for filtering and washing. The precipitate product was thoroughly rinsed with deionized water until the conductivity of the rinsing water was equal to or less than 50 µS.

The wet cobalt precipitate was then contacted with an acidic solution, in particular 20% $HNO_3$ solution, for 1 hour. After one hour, the cobalt precipitate was thoroughly washed with deionized water by vacuum filtration. The undried acid-treated Co/Zr precipitate was further mixed in a slurry with silicic acid and LUDOX® AS-40 (22 nm) colloidal silica in amounts sufficient to provide in the spray dried particles with 10% silica from the silicic acid and 38.8% silica from the colloidal silica. The slurry was spray dried and calcined in air at 550° C. for 3 hours. Finally the required amount of potassium was incorporated by impregnation using a potassium bicarbonate solution. The final product was dried and calcined in air at 300° C. for 2 hours.

Example 18

Continuous Precipitation and Acid Treatment Before Calcination

This example describes the preparation of a catalyst with the composition of $48.8Co/2.4Zr/48.8SiO_2$ according to the same procedure as Example 17 except that the potassium impregnation step was omitted. The average $CO_3O_4$ crystallite size for catalyst Example 18 measured by XRD was about 13 nm.

The implementation of the Jet-Cup Method was as follows: Five grams of sample were weighed and charged into the sample cup. The jet cup was then attached to the settling chamber. After all joints were sealed, humidified air with a relative humidity of 60.5% was introduced at a controlled rate of 15 l/min for one hour. The air flow was stopped after 1 hour on stream, and the fires in the thimbles and the coarse particles in the jet cup were recovered for analysis. It will be understood that this implementation is illustrative and standard variations are within the knowledge of one of ordinary skill in the art.

TABLE 7

Catalyst Attrition Measurement for Examples 14–18

| Example | Catalyst Composition | Acid Treatment | Attrition loss (%) Jet-Cup Method |
|---|---|---|---|
| 14 | 84.9Co/5Zr/0.1K/10SiO2 | None | 75.5 |
| 15 | 48.8Co/2.4Zr/48.8SiO2 | after calcination | 27.2 |
| 16 | 71.3Co/3.7Zr/25SiO2 | before calcination | 30.0 |
| 17 | 48.8Co/2.4Zr/0.1K/48.8SiO2 | before calcination | 17.5 |
| 18 | 48.8Co/2.4Zr/48.8SiO2 | before calcination | 17.6 |

Physical Properties of Examples 13, 15, 16 and 18

The BET surface area, pore volume, and pore diameter were estimated for Examples 13, 15, 16 and 18 using the nitrogen desorption method and shown in Table 8.

TABLE 8

Properties of precipitated bulk cobalt catalysts

| Ex. No. | | BET Surface Area, m²/g | Pore volume cc/g | Avg. Pore Dia. nm |
|---|---|---|---|---|
| 13 | 48.8Co/2.4Zr/48.8SiO$_2$ | 100 | 0.47 | 19 |
| 15 | 48.8Co/2.4Zr/48.8SiO$_2$ | 102 | 0.40 | 16 |
| 16 | 71.3Co/3.7Zr/25SiO$_2$ | 106 | 0.44 | 17 |
| 18 | 48.8Co/2.4Zr/48.8SiO2 | 156 | 0.57 | 15 |

Variation of Catalyst Wax Selectivity with Catalyst Composition

The Examples 14–17 were further tested for catalytic performance to illustrate the effect of acid treatment on the catalyst wax selectivity and of the amount of binder. The wax selectivity is quantified by the value of α, the Flory-Schultz chain growth probability, computed according to conventional methods.

After preparation, each catalyst sample from Examples 14–17 was reduced with H$_2$ at 310° C. for 6 hours. After the reduction pretreatment, the catalyst was tested in a 600-ml slurry bed reactor (CSTR) with operating conditions as listed in Table 9. The results demonstrate that the acid treatment did not seem to affect the catalysts performance. The performance of Example 15 (shown in Table 9) was similar to that of Example 13 (shown in Table 6) with the same composition but without acid treatment. Example 15 has a slightly higher C$_{5+}$ hydrocarbons productivity and a lower methane production.

Example 18 with the same preparation and composition except without potassium than Example 17 showed similar performance compared to Example 17 albeit for a shorter period of time of 3 days (about 76 hours). During this time the CO conversion (not shown in Table 9) was about 33% at 220° C., 350 psig, and a space velocity of 12 NL/h.g cat.

TABLE 9

Continuous-flow stirred tank reactor results for Examples 14–17

| | Example | | | |
|---|---|---|---|---|
| | 14 | 15 | 16 | 17 |
| Catalyst Characteristics | | | | |
| Composition | 84.9Co/5Zr/ 0.1K/10SiO$_2$ | 48.8Co/ 2.4Zr/ 48.8SiO$_2$ | 71.3Co/ 3.7Zr/ 25SiO$_2$ | 48.8Co/ 2.4Zr/0.1K/ 48.8SiO$_2$ |
| Silica precursors | silicic acid | silicic acid; silica sol | silicic acid; silica sol | silicic acid; silica sol |
| Acid treatment | None | after calcination | before calcination | before calcination |
| Synthesis performance | | | | |
| Temp. (° C.) | 230 | 225 | 217 | 225 |
| Pressure (Psig) | 350 | 350 | 350 | 350 |
| Space Vel. (NL/h · g cat) | 2 | 15.2 | 13.3 | 8.2 |
| Time on stream (h) | 770 | 78 | 245 | 366 |
| CO Conversion (%) | 48.2 | 41.4 | 41.6 | 41.2 |
| C$_1$, wt % | 23.6 | 7.4 | 10.1 | 14.3 |
| C$_5^+$ (g/hr/kgcat) | 104 | 839 | 749 | 468 |
| Alpha | 0.80 | 0.88 | 0.88 | 0.86 |

The present application incorporates by reference commonly assigned application U.S. application Ser. No. 10/324,419, entitled "Iron-based Fischer-Tropsch Catalysts and Methods of Making and Using", filed concurrently herewith.

Should the disclosure of any of the patents, patent applications, and publications that are incorporated herein conflict with the present specification to the extent that it might render a term unclear, the present specification shall take precedence.

As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

While preferred embodiments of this invention have been shown and described, modifications thereof can be made by one skilled in the art without departing from the spirit or teaching of this invention. The embodiments described herein are exemplary only and are not limiting. Many variations and modifications of the catalyst and process are possible and are within the scope of the invention. Accordingly, the scope of protection is not limited to the embodiments described herein, but is only limited by the claims which follow, the scope of which shall include all equivalents of the subject matter of the claims.

What is claimed is:

1. A process for producing hydrocarbons, comprising:
    contacting a feed stream comprising carbon monoxide and hydrogen with a bulk cobalt-based catalyst so as to convert at least a portion of said feed stream to hydrocarbons,
    wherein the bulk cobalt-based catalyst comprises an average cobalt oxide crystallite size between 10and 40nm, and has a BET surface area between 10 and 150m²/g, and further comprises
    between about 48.8 and about 90 percent by weight of cobalt;
    a textural promoter selected from the group consisting of zirconium, chromium, magnesium, cerium, and titanium;
    optionally, a Group I metal; and
    between 5 and 60 percent by weight of a binder selected from the group consisting of silica, alumina, titania, zirconia, and combinations thereof.

2. The process of claim 1 wherein the textural promoter is zirconium.

3. The process of claim 2 wherein the bulk cobalt-based catalyst comprises between about 2 and about 5 percent zirconium by weight.

4. The process of claim 1 wherein the bulk cobalt-based catalyst further comprises a Group I metal.

5. The process of claim 4 wherein the Group I metal is potassium.

6. The process according to claim 1 wherein the bulk cobalt-based catalyst has an attrition loss less than 40%.

7. The process of claim 1 wherein said hydrocarbons comprise hydrocarbons with 5 or more carbon atoms.

8. The process according to claim 1 wherein the bulk cobalt-based catalyst has an attrition loss less than 30%.

9. The process according to claim 1 wherein the bulk cobalt-based catalyst comprises a BET surface area between about 80 and about 150 square meters per gram of catalyst.

10. The process according to claim 1 wherein the bulk cobalt-based catalyst comprises from about 0.1 and 10 percent by weight of the textural promoter.

11. The process according to claim 1 wherein the bulk cobalt-based catalyst comprises from about 2 and about 5 percent by weight of the textural promoter.

12. The process according to claim 1 wherein the bulk cobalt-based catalyst comprises between about 48.8 and about 85 percent by weight of cobalt.

13. The process according to claim 1 wherein the bulk cobalt-based catalyst comprises from about 10 and about 60 percent by weight of the binder.

14. The process according to claim 1 wherein the binder comprises silica, alumina or combinations thereof.

15. The process according to claim 1 wherein the bulk cobalt-based catalyst comprises between about 0.05 and 5 wt. % of a Group I metal.

16. The process according to claim 1 wherein the bulk cobalt-based catalyst comprises between about 0.1 and about 0.2 wt. % of a Group I metal.

17. The process according to claim 1 wherein the bulk cobalt-based catalyst further comprises a non-Group I Fischer-Tropsch metal selected from the group consisting of rhenium, ruthenium, platinum, palladium, boron, silver, and combinations thereof.

18. The process according to claim 5 wherein the catalyst comprises between about 0.05 and 5 percent potassium by weight.

19. The process according to claim 1 wherein the catalyst is disposed in a slurry bed or slury bubble column, and comprises an average particle size between about 40 microns and about 100 microns.

20. The process according to claim 1 wherein the binder in the catalyst is derived from a precursor compound of the binder and from a sol of the binder.

21. The process according to claim 20 herein the binder sol includes particles having an average size between 10 and 100 nm.

22. The process according to claim 20 wherein the catalyst includes 5–15 wt. % binder derived from a binder precursor compound and 10–40 wt % binder derived from a binder sol.

23. The process according to claim 20 herein the catalyst includes 5–15 wt. % binder derived from a precursor compound of the binder and 35–50 wt. % binder derived from a binder sol.

24. The process according to claim 20 wherein the binder comprises silica, and includes 5–15 wt. % silica derived from silicic acid and 35–50 wt. % silica derived from a colloidal silica sol.

25. The process according to claim 20 wherein the binder comprises silica, and includes 5–15 wt. % silica derived from silicic acid and 10–20 wt % silica derived from a colloidal silica sol.

26. The process according to claim 1 wherein said hydrocarbons comprise at least one product selected from the group consisting of wax, diesel fuel, kerosene, jet fuel, heating oil, and gasoline.

* * * * *